United States Patent
Favero et al.

(10) Patent No.: US 9,631,135 B2
(45) Date of Patent: Apr. 25, 2017

(54) PROCESS FOR THE ENHANCED RECOVERY OF OIL BY INJECTION OF A POLYMER SOLUTION

(71) Applicant: S.P.C.M. SA, Andrezieux Boutheon (FR)

(72) Inventors: Cèdrick Favero, Saint Romain le Puy (FR); Sylvain Darras, Saint Georges Hauteville (FR); Bruno Giovannetti, Saint Etienne (FR)

(73) Assignee: S.P.C.M. SA, Andrezieux Boutheon (FR)

( * ) Notice: Subject to any disclaimer, the term of this patent is extended or adjusted under 35 U.S.C. 154(b) by 266 days.

(21) Appl. No.: 14/366,198

(22) PCT Filed: Jan. 14, 2013

(86) PCT No.: PCT/IB2013/050350
§ 371 (c)(1),
(2) Date: Jun. 17, 2014

(87) PCT Pub. No.: WO2013/108174
PCT Pub. Date: Jul. 25, 2013

(65) Prior Publication Data
US 2014/0326458 A1 Nov. 6, 2014

(30) Foreign Application Priority Data
Jan. 20, 2012 (FR) ..................................... 12 50585

(51) Int. Cl.
| | | |
|---|---|---|
| C09K 8/588 | (2006.01) | |
| C08F 220/56 | (2006.01) | |
| E21B 43/16 | (2006.01) | |
| C08F 220/06 | (2006.01) | |
| C08F 220/58 | (2006.01) | |
| C08F 226/10 | (2006.01) | |

(52) U.S. Cl.
CPC ............ *C09K 8/588* (2013.01); *C08F 220/56* (2013.01); *E21B 43/16* (2013.01); *C08F 220/06* (2013.01); *C08F 220/58* (2013.01); *C08F 226/10* (2013.01)

(58) Field of Classification Search
CPC .......... C09K 8/588; C09K 8/035; C09K 8/68; C09K 8/882; C09K 8/12; C09K 8/512; C09K 2208/24; C09K 2208/26; C09K 8/502; C09K 8/508; C09K 8/52; C09K 8/725; C09K 8/80; C09K 8/82; C09K 11/06; C09K 17/40; C09K 2208/08; C09K 2208/18; C09K 2208/28; C09K 2208/30; C09K 8/00; C09K 8/04; C09K 8/34; C09K 8/42; C09K 8/44; C09K 8/467; C09K 8/5083; C09K 8/516; C09K 8/518; C09K 8/528; C09K 8/5751; C09K 8/584; C09K 8/62; C09K 8/64; C09K 8/88; C09K 8/887; E21B 43/16; E21B 21/003; E21B 43/26; E21B 21/062; E21B 43/25; E21B 43/267
See application file for complete search history.

(56) References Cited

U.S. PATENT DOCUMENTS

| | | | | |
|---|---|---|---|---|
| 3,658,129 A | * | 4/1972 | Lanning | C09K 8/512 166/270 |
| 4,563,290 A | * | 1/1986 | Okada | C08F 220/56 507/226 |
| 4,653,584 A | | 3/1987 | Ball et al. | |
| 4,951,921 A | * | 8/1990 | Stahl | C08F 226/06 166/270 |
| 5,883,210 A | * | 3/1999 | Ahmed | C07C 237/04 526/263 |

(Continued)

FOREIGN PATENT DOCUMENTS

| | | |
|---|---|---|
| WO | 9722638 | 6/1997 |
| WO | WO97/22638 * | 6/1997 |
| WO | 2008107492 A1 | 9/2008 |

(Continued)

OTHER PUBLICATIONS

International Search Report for PCT/IB2013/050350 dated May 3, 2013.

(Continued)

*Primary Examiner* — Kumar R Bhushan
(74) *Attorney, Agent, or Firm* — Heslin Rothenberg Farley & Mesiti P.C.

(57) ABSTRACT

Process for enhanced oil recovery employing an aqueous solution comprising at least one linear or structured water-soluble copolymer obtained by polymerization:
  of at least 10 mol % of 2-acrylamido-2-methylpropane-sulfonic acid monomer in the free acid and/or salified form,
  of at least 10 mol % of at least one comonomer chosen from the group consisting of acrylamide, N-vinylpyrrolidone (NVP) and acrylamide-derived monomers of formula (I):

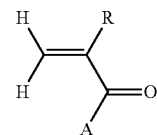

in which:
  R=H or $CH_3$ or $CH_2COOR'$, where R' is an alkyl comprising at most 3 carbon atoms,
  A is an N heterocycle comprising, in its ring, from 4 to 6 carbon atoms and optionally an ether functional group or a ketone functional group.

20 Claims, No Drawings

(56) References Cited

U.S. PATENT DOCUMENTS

2008/0125334 A1* 5/2008 Burns .................... C09K 8/512
507/219
2011/0118153 A1 5/2011 Pich et al.

FOREIGN PATENT DOCUMENTS

WO        2010133258 A1    11/2010
WO        2011100665 A2    8/2011

OTHER PUBLICATIONS

S. Thomas; "Enhanced Oil Recovery—An Overview," Oil & Gas Science and Technology—Rev. IFP, 2008, vol. 63, No. 1, pp. 9-19.

* cited by examiner

PROCESS FOR THE ENHANCED RECOVERY OF OIL BY INJECTION OF A POLYMER SOLUTION

CROSS REFERENCE TO RELATED APPLICATIONS

This application is a national stage filing under section 371 of International Application No. PCT/IB2013/050350, filed on Jan. 14, 2013, and published on Jul. 25, 2013 as WO 2013/108174 A1, and claims priority to French Application No. 1250585 filed on Jan. 20, 2012. The entire disclosures of each of the prior applications are hereby incorporated herein by reference.

The present invention relates to the technical field of the enhanced recovery of oil in a subterranean formation. More specifically, a subject matter of the present invention is an improved process for the enhanced recovery of oil which consists in introducing, into the subterranean formation, a fluid comprising ferrous ions, and/or hydrogen sulfide, and dissolved oxygen, said fluid being rendered viscous by means of an aqueous polymer solution, without use of stabilizing compounds.

More specifically, the invention relates to an improved process for the enhanced recovery of oil employing specific polymers which makes it possible to obtain an improved performance under conditions degrading for the polymer or polymers, this being achieved without using compounds which stabilize the polymer or polymers.

The majority of oil fields currently being operated are becoming mature and have, in fact, begun to decline in production or are on the point of doing so. The degree of recovery of these fields is currently of the order of 15 to 35% on average. They thus offer a still considerable production potential.

The recovery of crude oil present in subterranean formation s is generally carried out in several steps.

Production results first from the natural energy of the fluids and rock, which are decompressed. At the end of this depletion phase, the rate of oil recovered at the surface represents on average from 5 to 15% of the initial reserve. It is therefore necessary, in a second step, to employ techniques targeted at increasing the recovery yield while maintaining the pressure of the field.

The most frequently employed method consists in injecting water and more generally brine into the subterranean formation via injection wells dedicated to this purpose. The term used is then secondary recovery. This second phase stops when the water content of the mixture produced by the output wells is too high. The gain here, in terms of degree of recovery of additional oil, is of the order of from 10 to 20%.

The other techniques which can be used are combined under the name of enhanced oil recovery (EOR). Their aim is to recover between 10 and 35% of additional oil with respect to the initial amount. The term of "enhanced oil recovery" encompasses various thermal or nonthermal techniques, such as "electrical", "miscible", "steam" or "chemical" techniques, for improved recovery of the oil remaining in place (see "Oil & Gas Science and Technology"—IFP review, vol. 63 (2008), No. 1, pp. 9-19). Oil denotes any type of oil, namely light oil and heavy oil, as well as bituminous oil.

The invention relates more specifically to enhanced oil recovery by the chemical route involving at least the injection into the subterranean formation of an aqueous fluid comprising one or more water-soluble polymers.

Enhanced oil recovery (EOR) techniques are distinguished from the operations for the stimulation of a reservoir. The latter are characterized by limited injections in volume of polymer solution in order to create a localized phenomenon in the reservoir, namely, for the conformance, a blocking of the zones of high permeabilities and, for the water shut-off, a blocking of zone where water enters the formation. The injections are generally carried out either via an injection well or via a production well over fairly short times of a few days and generally less than one month, and with volumes representing less than 5% of the pore volume of the reservoir. The pore volume corresponds to the volume not occupied by the rock in the reservoir, which provides a correlation with the permeable zone.

Conversely, the enhanced oil recovery (EOR) techniques using polymers involve a continuous and prolonged injection of polymer solution in order to sweep the reservoir from an injection well as far as a production well. The aim is not to treat a zone of the reservoir but the reservoir in its entirety, in order to recover the maximum of oil. For this, it is necessary to inject a much greater volume of aqueous solution representing generally at least 50% to 500%, indeed even more, of the pore volume. An oily and sometimes gaseous aqueous mixtures are then recovered at the production side or sides.

The injection of the viscous polymer fluid, according to the technique employed, takes place alone or in combination with other chemical compounds of use in the improved recovery of the oil.

In all these techniques, the addition of water-soluble polymers allows to improve the sweep efficiency compared to water injection. The expected and proven benefits of the use of polymers, through rendering the injected water "more viscous", are the improvement in the areal sweep and the control of the mobility in the field in order to recover the oil more rapidly and efficiently. These polymers allow increasing the viscosity of the injection water.

It is known to a person skilled in the art that synthetic water-soluble polymers and in particular acrylamide-based water-soluble polymers are highly advantageous polymers in increasing the viscosity of aqueous solutions and are widely used in enhanced oil recovery.

The polyacrylamides used are predominantly anionic and are obtained by:
  copolymerization of acrylamide and acrylic acid,
  co-hydrolysis or post-hydrolysis of a polyacrylamide,
  copolymerization or terpolymerization of acrylamide with other ionic or nonionic functional monomers.

Polyacrylamides are already widely used in enhanced oil recovery in the "polymer", "surfactant polymer" and "alkaline surfactant polymer" (P, SP and ASP) techniques.

However, the water and brines used in oil fields comprise other chemical compounds which may degrade the viscosity of the polymers used and thus the desired efficiency is not reached as the viscosity of the fluid actually propagating in the field is lower than needed. In practice, on oil fields, the polymer is injected via an injection fluid (water, brine) which the content of oxygen, dissolved metals, hydrogen sulfide and another entities which interact with the polymer chain is not always controlled on controllable. These conditions result in a very significant deterioration in the properties of the injection fluid comprising the polymer, this being related in particular to degradations of the following types:
  biological,
  mechanical, and
  chemical.

The chemical degradation of the polymers corresponds to the mechanism which is the most difficult to anticipate and quantify. This is because this type of degradation can occur according to multiple mechanisms during the injection of the fluid comprising the polymer and/or in the reservoir used to store the injection fluid comprising the polymer prior to injection, or in the near wellbore area of the subterranean formation.

The chemical degradation is due first of all to the formation of free radicals which will react with the main chain of the polymer reducing its molecular weight. This then results in a decrease in viscosity of the injection fluid associated with a decrease in the hydrodynamic volume of the polymer chain in solution. The free radicals can originate from various sources: they can be generated by the cleavage of weak bonds of the polymer chain under the effect of heating/friction or by residues of initiators or impurities of by-products present in the polymer. Redox systems also generate free radicals. The presence of oxygen is the most harmful factor with regard to the degradation of the polymer. In addition, the reaction in which the polymers are degraded by the oxygen is accentuated by the presence of certain metals, such as iron, particularly ferrous $Fe^{2+}$ ions, or by the presence of hydrogen sulfide.

It is important to note that in the case of the operations for the stimulation of reservoirs such as the blocking of high permeability zones, it is sought to gel the polymer as much as possible so that it blocks the preferential passages of the well. One way of doing so is to oxidize the ferrous ions present in the injection fluid to ferric ions, in the presence of oxygen. The addition of oxygen is generally carried out when the polymer has reached the preferential passage so that the crosslinking of the polymer takes place in the presence of $Fe^{3+}$ ion in situ. This technology is more particularly described in U.S. Pat. No. 4,951,921.

In the case of enhanced oil recovery, during its injection into and its propagation in the porous medium, the polymer is thus subject to undesired chemical degradation. In order to overcome this problem, numerous solutions have been described in order to stabilize the polymers and thus reducing the extent of the chemical degradation.

For instance, U.S. Pat. No. 4,653,584 provides a copolymer based on acrylamide and on maleimide, for EOR application, having a high resistance to temperature, to high salinities and to high concentrations of di- and trivalent metal ions.

Application WO 2011/100665 provides two solutions for solving the problem of the presence of the $Fe^{2+}$ ions: reverse osmosis or the addition of chelating agents, otherwise known as metal-complexing agents.

U.S. Pat. No. 4,563,290 describes copolymers which are resistant to mechanical degradation and which are resistant to the impurities generally present in the water. These copolymers comprise at least 10 mol % of acrylic acid and less than 10 mol % of 2-acrylamido-2-methylpropanesulfonic acid.

In an EOR application, the resistance to ferrous ions and/or hydrogen sulfide represents a very particular problem to which the prior art provides, as sole solutions, the addition of a complexing agent or the treatment of the water by reverse osmosis.

The document WO 2010/133258 of the Applicant describes the protection of the water-soluble polymer or polymers by virtue of the combination of at least three stabilizing agents in one and the same formulation comprising the polymer before it is dissolved with the injection fluid.

Nevertheless, this efficient solution requires the preparation of a composition of at least four chemical compounds, which can sometimes prove to be problematic on oil fields, in particular for logistical reasons.

There thus exists a need for novel solutions which allow improving enhanced oil recovery by the chemical route without using stabilizing agents and without needing to install water-treatment processes, such as reverse osmosis.

The Applicant has demonstrated that, surprisingly and completely unexpectedly, the selection of certain monomers, in specific proportions and, where appropriate, the adjustment of the composition of the injection fluid allow to limit the degradation of the polymers in enhanced oil recovery processes.

U.S. Pat. No. 4,563,290 describes AMPS/NVP or AMPS/AM/NVP copolymers which are tested with a view to their use in EOR for their ability to thicken synthetic seawater samples, that is to say simple mixtures of water and salt. The ability of the polymers to withstand degrading free radical conditions is not described.

Document WO 97/22638 describes copolymers based on ATBS and on acryloyl piperazine derivatives (e.g. XIX, XXI), the stability of which is tested in synthetic seawater samples. Here too, the ability of the polymers to withstand degrading conditions in the presence of $Fe^{2+}$ ions and oxygen or hydrogen sulfide and oxygen is not described. Other polymers based on ATBS and on acryloyl morpholine (e.g. XXIII) are used for drilling, conformance or other "workover" operations for which it is sought to gel the polymer or it is sought to maintain a sufficient viscosity for flushing the well. Enhanced oil recovery under degrading conditions for the polymer in not envisioned.

U.S. Pat. No. 4,563,290 describes copolymers that can be used for enhanced oil recovery. They contain from 10 to 30 mol % of acrylic acid, less than 10 mol % of AMPS and from 60 to 89 mol % of acrylamide.

The present invention relates to an improved process for enhanced oil recovery which consists in rendering a fluid viscous by means of an aqueous polymer solution, in then injecting the fluid into the subterranean formation and in recovering the aqueous and oily mixture from the production well or wells.

More specifically, a subject matter of the invention is a process for enhanced oil recovery, which consists:
  in preparing, without the addition of stabilizing agent for the polymer, an aqueous solution comprising at least one linear or structured water-soluble copolymer obtained by polymerization:
    of at least 10 mol % of 2-acrylamido-2-methylpropanesulfonic acid monomer in the free acid and/or salified form,
    of at least 10 mol % of at least one comonomer chosen from the group consisting of acrylamide, N-vinylpyrrolidone (NVP) and acrylamide-derived monomers of formula (I):

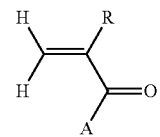

in which:
  R=H or $CH_3$ or $CH_2COOR'$, where R' is an alkyl comprising at most 3 carbon atoms, A is an N heterocycle comprising, in its ring, from 4 to 6 carbon atoms and optionally an ether functional group or a ketone functional group, optionally of less than 10 mol % of acrylic acid in the free acid and/or salified form, in introducing the aqueous solution into the injection fluid, without prior or subsequent addition, to the fluid, of stabilizing agent for the polymer, in injecting the injection fluid, then rendered viscous, into the reservoir, in recovering the aqueous and oily and/or gaseous mixture.

In practice, the injection fluid comprises at least 500 ppb of ferrous ions and/or 10 ppm of hydrogen sulfide, and at least 50 ppb of dissolved oxygen without exceeding 10 ppm of dissolved oxygen.

In other words, the composition of the injection fluid guarantees the absence of crosslinking or gelling of the polymer. More specifically, the composition of the fluid is such that the combination of the dissolved oxygen with the $Fe^{2+}$ does not lead to an amount of $Fe^{3+}$ such that the polymer crosslinks or gels. Of course, the composition of the injection fluid will be adjusted if necessary depending on its original composition. More specifically, the injection fluid generally used is obtained using the water phase of the back-product fluid after separation of the oil at the end of the EOR process. When this fluid contains too much oxygen, the composition of said fluid is adjusted. In the other cases, the composition of the injection fluid obtained after separation does not need to be adjusted.

In the injection fluid, the weight ratio between the amount of $Fe^{2+}$ ions (expressed in ppm) and the amount of dissolved oxygen in this fluid (expressed in ppm) is advantageously greater than 10, preferably greater than 15.

According to an essential characteristic, the process is carried out without addition of stabilizing agent, without addition of complexing agent and without treatment of the injection water being necessary to protect the polymer or polymers used.

However, in order to overcome specific constraints inherent in the EOR process, it remains possible to use certain "stabilizing" agents, such as, for example, scale inhibitors, in order to treat the harmful presence of barium in the water, or radical-scavenging agents, in order to treat corrosion of the pipework.

In other words, the injection fluid does not comprise the additional stabilizing agents or stabilizing agents added deliberately. It is understood that compounds corresponding to the definition of a stabilizing agent may be present in the injection fluid but in amounts such that the stabilizing effect is not obtained.

The percentages, parts per million (ppm) and parts per billion (ppb) are all expressed with respect to the total weight of the injection fluid, that is to say with respect to the weight of the injection fluid comprising the polymer(s).

The 2-acrylamido-2-methylpropanesulfonic acid (ATBS) and acrylic acid monomers can be salified as an alkali metal salt, such as, for example, the sodium salt or the potassium salt, the ammonium salt, a salt having an amino alcohol, such as, for example, the monoethanolamine salt, or an amino acid salt.

Stabilizing agents for the polymer denotes the stabilizing agents described in patent application WO 2010/133258, namely deoxygenating agents, precipitating agents, radical-scavenging agents, sacrificial agents and complexing agents. They are, in particular but without implied limitation, sulfites in all the forms, carbohydrazides and hydrazine derivatives, sodium erythorbate, sodium carbonate and sodium phosphate, diethylthiourea, dimethylthiourea, mercaptobenzothiazole and mercaptobenzimidazole, glycerol, propylene glycol, trimethylene glycol, isopropanol, 1,2-butanediol, 1,3-butanediol, 1,4-butanediol, 2,3-butanediol, 1,2,4-butanetriol, pentaerythritol (PETA), trimethylolethane, neopentyl glycol, 1,2-pentanediol, 2,4-pentanediol, 2,3-pentanediol, trimethylolpropane, 1,5-pentanediol, polyacetates and polycarboxylates, polyaspartates, polyphosphates and polyphosphonates, polysuccinates, ethylenediaminetetraacetic acid (EDTA), heptasodium salt of diethylenetriaminepenta(methylenephosphonic acid) ($DTPMP.Na_7$), maleic acid, nitrilotriacetic acid (NTA) or oxalic acid.

According to another specific aspect of the present invention, the polymer of the aqueous solution is derived from the polymerization of:

at least 15 mol %, preferably at least 20 mol %, of 2-acrylamido-2-methylpropanesulfonic acid (ATBS) in the free acid and/or salified form;

at least 20 mol %, preferably at least 30 mol %, very preferably at least 40 mol %, of at least one monomer chosen from the group consisting of acrylamide, N-vinylpyrrolidone and monomers of formula (I).

In a specific embodiment, the polymer is also derived from the polymerization of the same monomers and in the same proportions as mentioned above and also contains less than 8 mol %, preferably less than 4 mol % and very preferably less than 1 mol % of acrylic acid in the free acid and/or salified form.

In a specific embodiment, the radical A of the acrylamide-derived monomer of formula (I) is chosen from the group consisting of 2-pyrrolidone, pyrrolidine and 4-morpholine.

Advantageously, the acrylamide-derived monomer of formula (I) is chosen from the group consisting of acryloylpyrrolidone, acryloylpyrrolidine and acryloylmorpholine.

The Applicant, surprisingly and completely unexpectedly, has demonstrated that the polymers meeting these conditions allow to achieve performances unequaled in terms of enhanced oil recovery by the chemical route, even when the compositions of the water or brines comprise ferrous $Fe^{2+}$ ions and/or hydrogen sulfide in combination with dissolved oxygen.

The polymers according to the invention exhibit an intrinsic resistance when, in an aqueous solution, they are brought into contact either:

with ferrous $Fe^{2+}$ ions and with dissolved oxygen, or with hydrogen sulfide and with dissolved oxygen, or with $Fe^{2+}$ ions, with hydrogen sulfide and with dissolved oxygen.

In other words, the performance associated with the viscosity of the injected fluid is not significantly affected during the sweep of the oil well. The polymer retains its properties, in particular its viscosifying properties. Consequently, the oil can be more efficiently pushed, thus improving the rate of recovery.

During an enhanced oil recovery operation, the polymer may remain in the underground formation and thus may encounter these degrading conditions for several months, sometimes more than 6 months. It is therefore essential for the polymer not to degrade or to degrade only slightly over time in order to retain its viscosifying properties with the aim of pushing the oil as far as the production well. The polymers according to the invention allow to achieve this objective.

It is also been discovered that these polymers offer good resistance to these degrading conditions, including when the latter reach high levels of degrading agent, namely when the viscosified injection fluid comprises:
- more than 1000 ppb of ferrous $Fe^{2+}$ ions, preferably even more than 2000 ppb of $Fe^{2+}$ ions, and even preferably more than 5000 ppb of $Fe^{2+}$ ions, and up to 100 ppm, and/or
- more than 20 ppm of hydrogen sulfide, preferably even more than 40 ppm of hydrogen sulfide, and up to 400 ppm, and
- more than 100 ppb of dissolved oxygen, preferably even more than 200 ppb of dissolved oxygen, and even preferably more than 1000 ppb of dissolved oxygen, up to 10 ppm.

In practice, the amount of dissolved oxygen must be between 500 ppb and 10 ppm, advantageously less than 4 ppm, preferably less than 2 ppm.

The water used to prepare the polymer solution and the constitutive water of the viscosified injection fluid can be an aquifer water, a water recovered from the production well and then treated, a sea water or a brine comprising more dissolved inorganic salts than conventional sea water, which on average contains between 20 and 50 g/l thereof. The inorganic salts can be for instance calcium chloride, potassium chloride, sodium chloride or their mixtures.

The aqueous solution of polymers which makes it possible to render the injection fluid viscous advantageously comprises between 2000 and 50 000 ppm of polymers.

In addition, the injection fluid viscosified by the polymer or polymers comprises between 200 ppm and 5000 ppm of one or more water-soluble polymers resulting from the polymer-based solution, preferably between 300 ppm and 4000 ppm.

The viscosified injection fluid can additionally comprise:
- one or more surfactants. The surfactant can, for example be chosen from the group consisting of anionic surfactants and their zwitterions chosen from the group consisting of alkyl sulfate, alkyl ether sulfates, arylalkyl sulfate, arylalkyl ether sulfate, alkylsulfonate, alkyl ether sulfonate, arylalkylsulfonate, arylalkyl ether sulfonate, alkyl phosphate, alkyl ether phosphate, arylalkyl phosphate, arylalkyl ether phosphate, alkylphosphonate, alkyl ether phosphonate, arylalkylphosphonate, arylalkyl ether phosphonate, alkylcarboxylate, alkyl ether carboxylate, arylalkylcarboxylate, arylalkyl ether carboxylate, polyalkyl ether and polyarylalkyl ether derivatives. In the context of the invention, "alkyl" is understood to mean a saturated or unsaturated hydrocarbon group having from 6 to 24 carbon atoms which is branched or unbranched, which is linear or which optionally comprises one or more cyclic units, which can optionally comprise one or more heteroatoms (O, N, S).

Arylalkyl group defines an alkyl group as defined above comprising one or more aromatic ring systems, it being possible for said aromatic ring systems optionally to comprise one or more heteroatoms (O, N, S).
- one or more alkaline agents, for example chosen from alkali metal or ammonium hydroxides, carbonates and bicarbonates, such as sodium carbonate.
- one or more oil dispersing agents, such as hydroxylated polymers having low molecular weights.

In the end, advantageously, the viscosified injection fluid obtained exhibits an optimum viscosity which can be between 2 and 200 cPs (centipoises). The viscosity measurement is carried out at 20° C. with a Brookfield viscometer, and with a UL module and a speed 6 of rpm (revolutions per minute).

In the context of the invention, the viscosified injection fluid comprising the desired polymer or polymers is subsequently injected into a subterranean formation containing oil deposit, according to any technique known to a person skilled in the art of enhanced oil recovery processes, also known as EOR processes. It is prepared on site, immediately before its injection into the formation. Generally, all the components introduced into the aqueous solution are added on a main line containing the aqueous solution or brine.

The polymer according to the invention can also comprise:
- monomers having a hydrophobic nature, such as, for example, undecanoic acid acrylamide, undodecyl acid methyl acrylamide, or acrylic acid derivatives, such as alkyl acrylates or methacrylates, such as, for example, behenyl ethoxy (25) methacrylate;
- branching agents, such as polyvalent metal salts, formaldehyde, glyoxal, or also, and preferably, covalent cross-linking agents capable of copolymerizing with the monomers and preferably monomers having polyethylenic unsaturation (having a minimum of two unsaturated functional groups), such as, for example, vinyl, allyl, acrylic and epoxy functional groups, and mention may be made, for example, of methylenebisacrylamide (MBA) or triallylamine.

According to the invention, the polymer can be linear or structured, that is to say star branched (in the form of a star) or comb branched (in the form of a comb).

Structured polymer denotes a nonlinear polymer which has side chains, so as to obtain, when this polymer is dissolved in water, a strong state of entanglement, resulting in very high viscosities at low gradient.

The water-soluble polymer used exhibits a molecular weight of greater than or equal to 1 million g/mol, in particular belonging to the range extending from 1 to 25 million g/mol, and preferably greater than 2.5 million g/mol.

According to a specific embodiment of the present invention, the polymer can be chosen from the group consisting of:
- copolymers comprising from 10 to 50 mol % of 2-acrylamido-2-methylpropanesulfonic acid and/or of its salified form, and from 10 to 50 mol % of acrylamide;
- copolymers comprising from 10 to 50 mol % of 2-acrylamido-2-methylpropanesulfonic acid and/or of its salified form, and from 10 to 50 mol % of acryloylpyrrolidone;
- copolymers comprising from 10 to 50 mol % of 2-acrylamido-2-methylpropanesulfonic acid and/or of its salified form, and from 10 to 50 mol % of acryloylpyrrolidine;
- copolymers comprising from 10 to 50 mol % of 2-acrylamido-2-methylpropanesulfonic acid and/or of its salified form, and from 10 to 50 mol % of acryloylmorpholine;
- copolymers comprising from 10 to 50 mol % of 2-acrylamido-2-methylpropanesulfonic acid and/or of its salified form, and from 10 to 50 mol % of N-vinylpyrrolidone.

According to another embodiment, the copolymer is a terpolymer, the two comonomers in addition to ATBS being chosen from the group consisting of acrylamide, N-vinylpyrrolidone and the monomers of formula (I).

They can, for example, be:
- terpolymers comprising from 10 to 50 mol % of 2-acrylamido-2-methylpropanesulfonic acid and/or of its salified form, from 10 to 80 mol % of acrylamide and from 10 to 50 mol % of acryloylpyrrolidone;

terpolymers comprising from 10 to 50 mol % of 2-acrylamido-2-methylpropanesulfonic acid and/or of its salified form, from 10 to 80 mol % of acrylamide and from 10 to 50 mol % of N-vinylpyrrolidone;

terpolymers comprising from 10 to 50 mol % of 2-acrylamido-2-methylpropanesulfonic acid and/or of its salified form, from 10 to 80 mol % of acrylamide and from 10 to 50 mol % of acryloylpyrrolidine;

terpolymers comprising from 10 to 50 mol % of 2-acrylamido-2-methylpropanesulfonic acid and/or of its salified form, from 10 to 80 mol % of acrylamide and from 10 to 50 mol % of acryloylmorpholine;

terpolymers comprising from 10 to 50 mol % of 2-acrylamido-2-methylpropanesulfonic acid and/or of its salified form, from 10 to 50 mol % of N-vinylpyrrolidone and from 10 to 50 mol % of acryloylpyrrolidone;

terpolymers comprising from 10 to 50 mol % of 2-acrylamido-2-methylpropanesulfonic acid and/or of its salified form, from 10 to 50 mol % of N-vinylpyrrolidone and from 10 to 50 mol % of N-vinylpyrrolidone;

terpolymers comprising from 10 to 50 mol % of 2-acrylamido-2-methylpropanesulfonic acid and/or of its salified form, from 10 to 50 mol % of N-vinylpyrrolidone and from 10 to 50 mol % of acryloylpyrrolidine;

terpolymers comprising from 10 to 50 mol % of 2-acrylamido-2-methylpropanesulfonic acid and/or of its salified form, from 10 to 50 mol % of N-vinylpyrrolidone and from 10 to 50 mol % of acryloylmorpholine.

According to another embodiment, the copolymer is a tetrapolymer, the three comonomers in addition to ATBS being chosen from the group consisting of acrylamide, N-vinylpyrrolidone and the monomers of formula (I).

According to the present invention, the water-soluble polymers used do not require the development of a specific polymerization process. They can be obtained by any polymerization technique well known to a person skilled in the art (solution polymerization, suspension polymerization, gel polymerization, precipitation polymerization, emulsion polymerization (aqueous or inverse), followed or not followed by a stage of spray drying, suspension polymerization, micelle polymerization, followed or not followed by a stage of precipitation, post-hydrolysis or co-hydrolysis polymerization, "template" polymerization, of radical or also controlled radical type).

The polymer is preferably provided in the form of a powder or inverse emulsion. In the case where it is in the form of an inverse emulsion, it can be dissolved, either directly in the brine or by using the method described in patent application US 2011/0118153, which provides for the dissolution, in line and continuously, of inverse emulsions of water-soluble polymers.

In the case where the polymer is provided in the form of a powder, this dissolution can be carried out, in particular, using a unit as described in patent application WO 2008/107492 and sold by the applicant company under the reference PSU "Polymer Slicing Unit".

Reference may be made to patent application WO 2008/107492 for more details with regard to the unit which can be employed in the context of the invention for the incorporation of the polymer-based composition in the aqueous solution. This unit operates under an inert atmosphere and makes it possible to reduce the risks of introduction of oxygen in this stage of dissolution of the polymer in the aqueous solution.

The invention and the advantages which result therefrom will emerge more fully from the following examples, given in order to illustrate the invention and without implied limitation.

A—Resistance of the Polymers under Highly Degrading Conditions (Completely Aerobic Conditions)

A series of polymers was tested under highly degrading conditions. 2000 ppm of each of the polymers are dissolved in an aqueous saline solution containing 7 ppm of dissolved oxygen (aerobic condition) and 10 ppm of $Fe^{2+}$ ions. The aqueous saline solution contains 30 g/l of NaCl and 3 g/l of $CaCl_2$.

The solutions are stored at a temperature of 20° C. and viscosity measurements are carried out, also at 20° C., after 7 days and after 30 days with a Brookfield viscometer, UL spindle and speed of 6 rounds per minute (rpm).

The losses in viscosity, expressed as %, correspond to the difference between the initial viscosity and the viscosity after aging for 7 days or 30 days, the whole being divided by the initial viscosity.

The results are recorded in the following table 1:

| Polymer | Composition of the polymer | Monomer ratio (mol %) | Loss in viscosity after 7 days | Loss in viscosity after 30 days |
|---|---|---|---|---|
| A | AM/AA | 75/25 | 83% | 95% |
| B | AM/ATBS | 97.5/2.5 | 67% | 85% |
| C | AM/ATBS/AA | 75/10/15 | 65% | 80% |
| D | AM/ATBS/AA | 75/20/5 | 35% | 45% |
| E | AM/ATBS | 75/25 | 15% | 38% |
| F | ATBS/NVP | 50/50 | 10% | 25% |
| G | AM/ATBS/NVP | 50/25/25 | 17% | 34% |
| H | AM/ATBS/ACMO | 50/25/25 | 16% | 27% |
| I | AM/ATBS/NVP/ACMO | 40/30/20/20 | 13% | 22% |

ATBS = 2-acrylamido-2-methylpropanesulfonic acid
AA = acrylic acid
AM = acrylamide
NVP = N-vinylpyrrolidone The polymers according to the invention (D to I) allow to obtain aqueous solutions having a viscosity which is not significantly affected by the simultaneous presence of $Fe^{2+}$ ions and dissolved oxygen in a very large amount, this being the case even without the presence of "stabilizing" agents. This thus results in a better ability of the injected fluid to efficiently sweep the reservoir and to improve the rate of the enhanced oil recovery.

B—Resistance of the Polymers under Degrading Conditions which can be Envisaged on an Oil Field The same series of polymers was tested under field conditions. 2000 ppm of each of the polymers are dissolved in an aqueous saline solution containing 1000 ppm of dissolved oxygen and 20 ppm of $Fe^{2+}$ ions. The aqueous saline solution contains 30 g/l of NaCl and 3 g/l of $CaCl_2$.

The solutions are stored at a temperature of 75° C. and without reintroducing oxygen, and viscosity measurements are carried out, at 20° C., after 7 days and after 30 days with a Brookfield viscometer, UL spindle and speed of 6 rounds per minute (rpm) in a glovebox in order to protect from degradation during the measurement.

The results are recorded in the following table 2:

| Polymer | Composition of the polymer | Monomer ratio (mol %) | Loss in viscosity after 7 days | Loss in viscosity after 30 days |
|---|---|---|---|---|
| A | AM/AA | 75/25 | 66% | 85% |
| B | AM/ATBS | 97.5/2.5 | 58% | 64% |
| C | AM/ATBS/AA | 75/10/15 | 45% | 55% |
| D | AM/ATBS/AA | 75/20/5 | 31% | 37% |
| E | AM/ATBS | 75/25 | 17% | 27% |
| F | ATBS/NVP | 50/50 | 14% | 19% |
| G | AM/ATBS/NVP | 50/25/25 | 8% | 13% |
| H | AM/ATBS/ACMO | 50/25/25 | 9% | 13% |
| I | AM/ATBS/NVP/ACMO | 40/30/20/20 | 6% | 11% |

These results confirm that the polymers from D to I according to the invention are indeed resistant to the conditions under which the presence of dissolved oxygen is combined with the presence of $Fe^{2+}$ ions, this being the case even without the presence of "stabilizing" agents.

C—Resistance of the Polymers in the Presence of Hydrogen Sulfide

The polymers A, E and G were tested under the following conditions: 2000 ppm of each of the polymers are dissolved in an aqueous saline solution containing 7 ppm of dissolved oxygen (aerobic condition) and 25 ppm of hydrogen sulfide. The aqueous saline solution contains 30 g/l of NaCl and 3 g/l of $CaCl_2$.

The solutions are stored at a temperature of 20° C. and viscosity measurements are carried out, also at 20° C., after 15 days with a Brookfield viscometer, UL module and speed of 6 revolutions/min.

The results are recorded in the following table 3:

| Polymer | Composition of the polymer | Monomer ratio (mol %) | Loss in viscosity after 157 days |
|---|---|---|---|
| A | AM/AA | 75/25 | 78% |
| E | AM/ATBS | 75/25 | 22% |
| G | AM/ATBS/NVP | 50/25/25 | 15% |

These results clearly show the superiority of the polymers E and G when these polymers are subjected to the joint presence of oxygen and hydrogen sulfide.

The invention claimed is:

1. A process for enhanced oil recovery, said process comprising:
preparing, without the addition of stabilizing agent for the polymer, an aqueous solution comprising at least one linear or structured water-soluble copolymer obtained by polymerization:
of at least 10 mol % of 2-acrylamido-2-methylpropanesulfonic acid (ATBS) monomer in the free acid and/or salified form,
of at least 10 mol % of at least one comonomer chosen from the group consisting of acrylamide, N-vinylpyrrolidone (NVP) and acrylamide-derived monomers of formula (I):

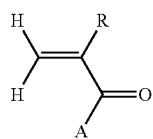

in which:
R=H or $CH_3$ or $CH_2COOR'$, where R' is an alkyl comprising at most 3 carbon atoms,
A is an N heterocycle comprising, in its ring, from 4 to 6 carbon atoms and optionally an ether functional group or a ketone functional group,
optionally, of less than 10 mol % of acrylic acid in the free acid and/or salified form,
introducing the aqueous solution into injection fluid, without prior or subsequent addition, to the fluid, of stabilizing agent for the polymer,
injecting the injection fluid, then rendered viscous with a viscosity between 2 and 200 cPs, into the reservoir, and
recovering the aqueous and oily and/or gaseous mixture,
wherein the injection fluid comprises, prior to injecting the aqueous solution therein, at least 500 ppb of ferrous ions and/or at least 10 ppm of hydrogen sulfide, and between 500 ppb and 10 ppm of dissolved oxygen, and
wherein crosslinking or gelling of the water-soluble copolymer does not occur in the injection fluid.

2. The process according to claim 1, wherein the injection fluid comprises between 500 ppb and 4 ppm of dissolved oxygen.

3. The process according to claim 1, wherein the copolymer is obtained by polymerization of:
at least 15 mol % of 2-acrylamido-2-methylpropanesulfonic acid (ATBS) in the free acid and/or salified form; and
at least 20 mol % of at least one monomer chosen from the group consisting of acrylamide, N-vinylpyrrolidone and monomers of formula (I).

4. The process according to claim 1, wherein the copolymer is obtained by polymerization of:
at least 15 mol % of 2-acrylamido-2-methylpropanesulfonic acid (ATBS) in the free acid and/or salified form;
at least 20 mol % of at least one monomer chosen from the group consisting of acrylamide, N-vinylpyrrolidone and monomers of formula (I),
less than 8 mol % of acrylic acid in the free acid and/or salified form.

5. The process according to claim 1, wherein the radical A of the acrylamide-derived monomer of formula (I) is chosen from the group consisting of 2-pyrrolidone, pyrrolidine and 4-morpholine.

6. The process according to claim 1, wherein the acrylamide-derived monomer of formula (I) is chosen from the group consisting of acryloylpyrrolidone, acryloylpyrrolidine and acryloylmorpholine.

7. The process according to claim 1, wherein the polymer is chosen from the group consisting of:
copolymers comprising from 10 to 50 mol % of 2-acrylamido-2-methylpropanesulfonic acid and/or of its salified form, and from 10 to 50 mol % of acrylamide;
copolymers comprising from 10 to 50 mol % of 2-acrylamido-2-methylpropanesulfonic acid and/or of its salified form, and from 10 to 50 mol % of acryloylpyrrolidone;
copolymers comprising from 10 to 50 mol % of 2-acrylamido-2-methylpropanesulfonic acid and/or of its salified form, and from 10 to 50 mol % of acryloylpyrrolidine;
copolymers comprising from 10 to 50 mol % of 2-acrylamido-2-methylpropanesulfonic acid and/or of its salified form, and from 10 to 50 mol % of acryloylmorpholine; and copolymers comprising from 10 to 50 mol % of 2-acrylamido-2-methylpropanesulfonic acid and/or of its salified form, and from 10 to 50 mol % of N-vinylpyrrolidone.

8. The process according to claim 1, wherein the copolymer is a terpolymer, the two comonomers in addition to ATBS being chosen from the group consisting of acrylamide, N-vinylpyrrolidone (NVP) and the monomers of formula (I).

9. The process according to claim 1, wherein the copolymer is chosen from the group consisting of:
  terpolymers comprising from 10 to 50 mol % of 2-acrylamido-2-methylpropanesulfonic acid and/or of its salified form, from 10 to 80 mol % of acrylamide and from 10 to 50 mol % of acryloylpyrrolidone;
  terpolymers comprising from 10 to 50 mol % of 2-acrylamido-2-methylpropanesulfonic acid and/or of its salified form, from 10 to 80 mol % of acrylamide and from 10 to 50 mol % of N-vinylpyrrolidone;
  terpolymers comprising from 10 to 50 mol % of 2-acrylamido-2-methylpropanesulfonic acid and/or of its salified form, from 10 to 80 mol % of acrylamide and from 10 to 50 mol % of acryloylpyrrolidine;
  terpolymers comprising from 10 to 50 mol % of 2-acrylamido-2-methylpropanesulfonic acid and/or of its salified form, from 10 to 80 mol % of acrylamide and from 10 to 50 mol % of acryloylmorpholine;
  terpolymers comprising from 10 to 50 mol % of 2-acrylamido-2-methylpropanesulfonic acid and/or of its salified form, from 10 to 50 mol % of N-vinylpyrrolidone and from 10 to 50 mol % of acryloylpyrrolidone;
  terpolymers comprising from 10 to 50 mol % of 2-acrylamido-2-methylpropanesulfonic acid and/or of its salified form, from 10 to 50 mol % of N-vinylpyrrolidone and from 10 to 50 mol % of N-vinylpyrrolidone;
  terpolymers comprising from 10 to 50 mol % of 2-acrylamido-2-methylpropanesulfonic acid and/or of its salified form, from 10 to 50 mol % of N-vinylpyrrolidone and from 10 to 50 mol % of acryloylpyrrolidine; and
  terpolymers comprising from 10 to 50 mol % of 2-acrylamido-2-methylpropanesulfonic acid and/or of its salified form, from 10 to 50 mol % of N-vinylpyrrolidone and from 10 to 50 mol % of acryloylmorpholine.

10. The process according to claim 1, wherein the copolymer is a tetrapolymer, the three comonomers in addition to ATBS being chosen from the group consisting of acrylamide, N-vinylpyrrolidone and the monomers of formula (I).

11. The process according to claim 1, wherein the polymer solution comprises between 2000 and 50 000 ppm of polymers.

12. The process according to claim 1, wherein the injection fluid comprises between 200 and 5000 ppm of polymer resulting from the polymer-based solution.

13. The process according to claim 1, wherein the injection fluid additionally comprises at least one surfactant and/or at least one alkaline agent and/or at least one fluidizer.

14. The process according to claim 1, wherein the polymer additionally comprises at least one hydrophobic monomer chosen from the group consisting of undecanoic acid acrylamide, undodecyl acid methyl acrylamide and behenyl ethoxy (25) methacrylate.

15. The process according to claim 1, wherein the viscosified injection fluid comprises:
  more than 1000 ppb of ferrous $Fe^{2+}$ ions, and up to 100 ppm, and/or
  more than 20 ppm of hydrogen sulfide, and up to 400 ppm, and
  between 500 ppb and 10 ppm of dissolved oxygen.

16. The process according to claim 1, wherein the weight ratio between the amount of $Fe^{2+}$ ions (expressed in ppm) and the amount of dissolved oxygen in the injection fluid (expressed in ppm) is greater than 10.

17. The process according to claim 2, wherein the injection fluid comprises between 500 ppb and 2 ppm of dissolved oxygen.

18. The process according to claim 3, wherein the copolymer is obtained by polymerization of:
  at least 20 mol %, of 2-acrylamido-2-methylpropanesulfonic acid (ATBS) in the free acid and/or salified form; and
  at least 30 mol % of at least one monomer chosen from the group consisting of acrylamide, N-vinylpyrrolidone and monomers of formula (I).

19. The process according to claim 18, wherein the copolymer is obtained by polymerization of:
  at least 20 mol %, of 2-acrylamido-2-methylpropanesulfonic acid (ATBS) in the free acid and/or salified form; and
  at least 40 mol % of at least one monomer chosen from the group consisting of acrylamide, N-vinylpyrrolidone and monomers of formula (I).

20. The process according to claim 15, wherein the viscosified injection fluid comprises:
  more than 5000 ppb of ferrous $Fe^{2+}$ ions, and up to 100 ppm, and/or
  more than 40 ppm of hydrogen sulfide, and up to 400 ppm, and
  more than 1000 ppb of dissolved oxygen.

* * * * *